United States Patent
Hung et al.

(10) Patent No.: US 9,891,751 B2
(45) Date of Patent: Feb. 13, 2018

(54) TOUCH CONTROL DEVICE AND METHOD, AND METHOD FOR FORMING TOUCH CONTROL DEVICE

(71) Applicant: MStar Semiconductor, Inc., Hsinchu Hsien (TW)

(72) Inventors: Guo-Kiang Hung, Zhubei (TW); Chien-Chuan Chen, Zhubei (TW); Sheng-Shou Wang, Zhubei (TW); Chao-Yang Kuo, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 222 days.

(21) Appl. No.: 14/715,841

(22) Filed: May 19, 2015

(65) Prior Publication Data
US 2015/0338994 A1    Nov. 26, 2015

(30) Foreign Application Priority Data

May 20, 2014    (TW) .............................. 103117622 A

(51) Int. Cl.
*G06F 3/044*    (2006.01)
*G06F 3/041*    (2006.01)

(52) U.S. Cl.
CPC ............ *G06F 3/0418* (2013.01); *G06F 3/044* (2013.01); *G06F 2203/04103* (2013.01); *G06F 2203/04107* (2013.01); *Y10T 29/49119* (2015.01)

(58) Field of Classification Search
CPC ................................. G06F 3/044; G06F 3/0418
See application file for complete search history.

(56) References Cited

U.S. PATENT DOCUMENTS

| 2011/0151937 A1* | 6/2011 | Kusuda | G06F 1/1626 455/566 |
| 2011/0316803 A1* | 12/2011 | Kim | G06F 3/044 345/173 |
| 2012/0087065 A1* | 4/2012 | Kim | G06F 1/1656 361/679.01 |

(Continued)

FOREIGN PATENT DOCUMENTS

| CN | 103324345 A | 9/2013 |
| CN | 103399678 A | 11/2013 |
| TW | 201512737 A | 4/2015 |

OTHER PUBLICATIONS

Taiwan Office Action, dated Oct. 20, 2015, 7 pages.
SIPO Office Action, dated Jul. 18, 2017, 7 pages.

*Primary Examiner* — Kent Chang
*Assistant Examiner* — Scott Au
(74) *Attorney, Agent, or Firm* — Edell, Shapiro & Finnan, LLC

(57) ABSTRACT

A touch control device capable of preventing false positives is provided. The touch control device includes: a conductive plate, electrically connected to a predetermined potential; a sensing region, located above the conductive plate, including a plurality of capacitive sensing units; and a conductive ring, located above the conductive plate, disposed at a periphery of the sensing region. When a touch scanning signal is provided to one on-duty capacitive touch sensing unit of the capacitive touch sensing units, the conductive ring synchronously receives a control signal associated with the touch scanning signal.

8 Claims, 7 Drawing Sheets

(56) References Cited

U.S. PATENT DOCUMENTS

2012/0326992 A1* 12/2012 Yeh ..................... G06F 3/0418
 345/173
2012/0327017 A1* 12/2012 Sekizawa ............... G06F 3/045
 345/174

* cited by examiner

TOUCH CONTROL DEVICE AND METHOD, AND METHOD FOR FORMING TOUCH CONTROL DEVICE

This application claims the benefit of Taiwan application Serial No. 103117622, filed May 20, 2014, the subject matter of which is incorporated herein by reference.

BACKGROUND OF THE INVENTION

Field of the Invention

The invention relates in general to a touch control device and method and a method for forming a touch control device, and more particularly to a touch control device and method and a method for forming a touch control device capable of preventing false positives.

Description of the Related Art

In response to user requirements and progressing technologies, touch control technologies are extensively applied to electronic products. In general, a touch control module of touch control technologies, from top to bottom, includes a glass layer (or referred to as a protection layer), a sensing layer and a support layer. The support layer, usually made of a metal material (e.g., iron), is electrically connected to a ground potential, and has an area greater than that of the sensing layer to fulfill a support effect. In other words, as the length and width of the support layer are respectively greater than the length and width of the sensing layer, a gap is preserved between an edge of the support layer and an edge of the sensing layer. However, due to the above structure, power lines emitted from sensing units at edges of the sensing layer may penetrate through the gap to connect to the support layer via a non-normal touch object on the glass layer, resulting in a false positive. For example, when water drops or other splashed liquids are located near positions of the gap on the glass layer, the power lines of nearby sensing units may form an electrical connection of different potentials with the grounded support layer sequentially through the glass layer, the water drops or liquids, the glass layer and the gap. As such, the sensing units are caused to generate a potential change that may further trigger a false positive of a touch point.

In some conventional solutions, an electrostatic discharge (ESD) circuit is disposed in the gap between an edge of the support layer and an edge of the sensing layer. Since the ESD circuit is similarly electrically connected to a ground potential or a predetermined constant potential, an electrical connection of different potentials may still be formed with the sensing layer to lead to a false detecting results.

SUMMARY OF THE INVENTION

The invention is directed to a touch control device and method for improving issues of the prior art.

The present invention discloses a touch control device capable of preventing false detecting results. A touch control device according to an embodiment includes: a conductive plate, electrically coupled to a predetermined potential; a sensing region, located above the conductive plate, including a plurality of capacitive sensing units; and a conductive ring, located above the conductive plate, disposed at a periphery of the sensing region. When a touch scanning signal is provided to one on-duty capacitive sensing units of the capacitive sensing units, the conductive ring synchronously receives a control signal associated with the touch scanning signal. As such, an unexpected potential difference when the conductive ring and the on-duty sensing unit form an electrical connection through power lines is eliminated to further prevent false detecting results caused by improper charge/discharge of the on-duty sensing unit.

The present invention further discloses a touch control method applied to a touch control device. The touch control device includes a conductive plate and a sensing region. The sensing region is located above the conductive plate, and includes a plurality of capacitive sensing units. A touch control method according to an embodiment of the present invention includes: forming a conductive ring at a periphery of the sensing region; providing a touch scanning signal to one on-duty capacitive sensing unit of the capacitive sensing units; and providing a control signal associated with the touch scanning signal to the conductive ring. As such, an unexpected potential difference when the conductive ring and the on-duty sensing unit form an electrical connection through power lines is eliminated to further prevent false detecting results caused by improper charge/discharge of the on-duty sensing unit.

The present invention further discloses a method for forming a touch control device. The method according to an embodiment includes: providing a conductive plate, which is electrically coupled to a predetermined potential; disposing a sensing region above the conductive plate, the sensing region including a plurality of capacitive sensing units; and forming a conductive ring above the conductive plate and at a periphery of the sensing region. When a touch scanning signal is provided to one on-duty capacitive sensing unit of the capacitive sensing units, the conductive ring synchronously receives a control signal associated with the touch scanning signal. As such, an unexpected potential difference when the conductive ring and the on-duty sensing unit form an electrical connection through power lines is eliminated to further prevent false detecting results caused by improper charge/discharge of the on-duty sensing unit.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 1b is a side view of the embodiment in FIG. 1a;

DETAILED DESCRIPTION OF THE INVENTION

Technical terms of the application are based on the general definition in the technical field of the application. If the application describes or explains one or some terms, definitions of the terms are based on the description or explanation of the application.

The present invention discloses a touch control device, a touch control method and a method for forming a touch control device capable of preventing false detecting results caused by water drops, other liquids or other non-normal touch objects. The present invention is applicable to a touch control module (e.g., a capacitive touch control module) or a touch control device (e.g., a fixed or handheld touch control device). In possible implementation, one skilled person in the art may choose equivalent devices or steps to implement the disclosure based on the disclosure of the application. That is, the implementation of the disclosure is not limited in the embodiments described in the disclosure. Further, a part of the elements included in the device of the disclosure may be individually known. Without affecting the full disclosure and possible implementation of the computing device, the known details are omitted. Further, the methods of the present invention may be implemented by the device of the disclosure or an equivalent device. In possible implementation, one skilled person in the art may selectively implement part or all technical features of any embodiment of the application or selectively combine part or all technical features of the embodiments of the application based on the disclosure of the present invention to enhance the implementation flexibility of the present invention.

Figure 1A:
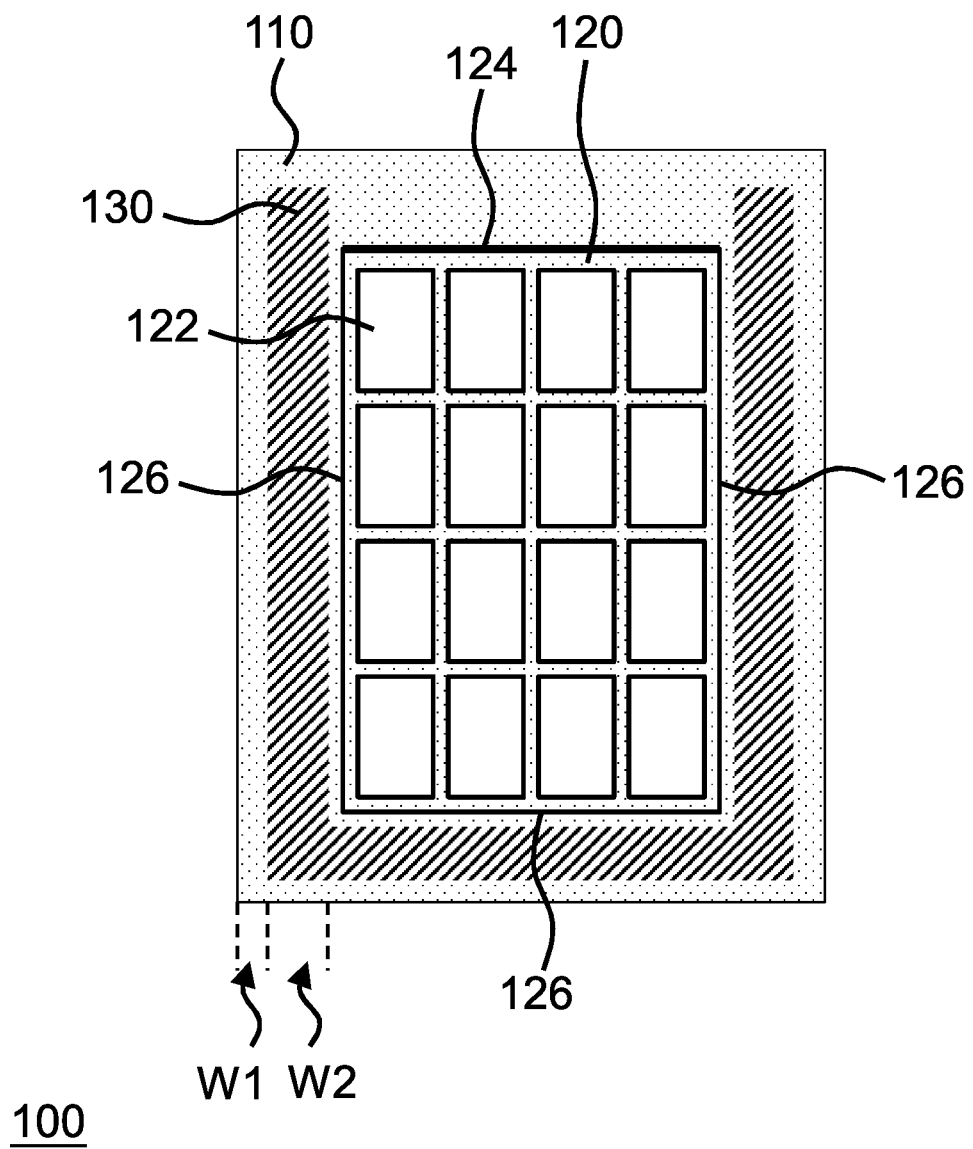
FIG. 1a is a top view of a touch control device according to an embodiment of the present invention.
Figure 1B:
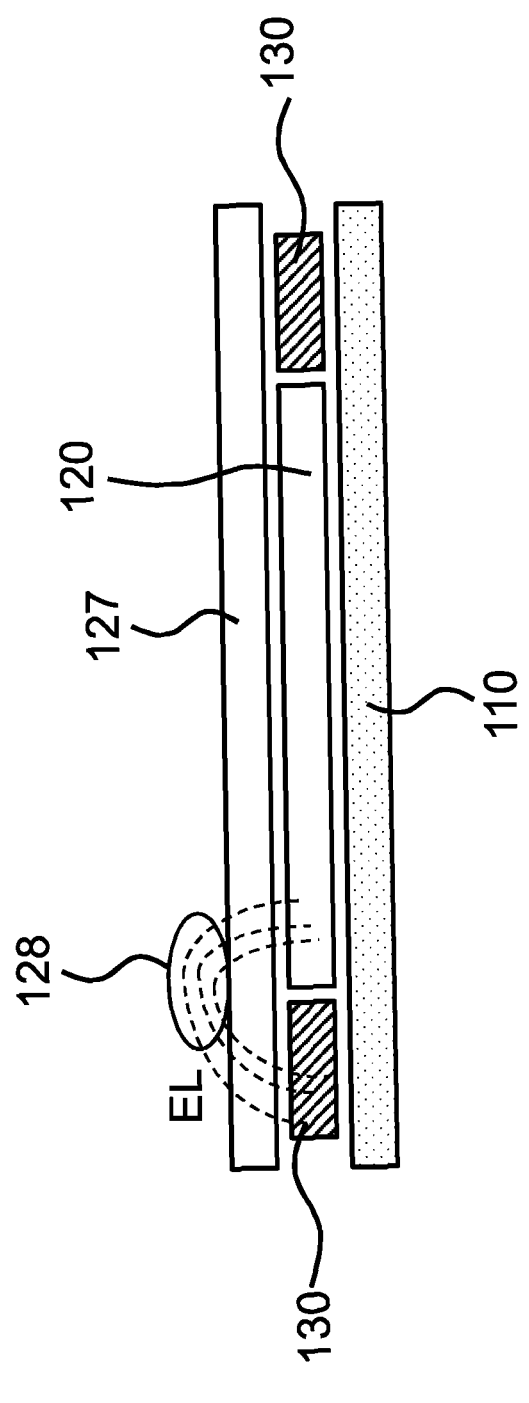

FIG. 1a and FIG. 1b are schematic diagrams of a touch control device according to an embodiment of the present invention. As shown in FIG. 1a and FIG. 1b, a touch control device 100 of the embodiment includes a conductive plate 110, a sensing region 120 and a conductive ring 130. The conductive plate 110, electrically coupled to a predetermined potential (e.g., a ground potential), provides a structural support function and plays a role of a grounding path. For example, the conductive plate 110 may be an even flat plate, a lattice plate or any structure that can provide the stated functions. The sensing region 120 includes a plurality of groups of capacitive sensing units 122, is located above the conductive plate 110, and is capable of sequentially receiving a touch scanning signal to perform touch detection. A periphery of the sensing region 120 is formed by a circuit board neighboring side 124 and at least two non-circuit board neighboring sides 126. Each group of capacitive sensing units 122 includes at least one electrode plate (e.g., a triangular electrode plate or an electrode plate having other planar contours), which is charged or discharged in response to the above touch scanning signal or an external touch event to accordingly reflect a potential change of the touch event. The conductive ring 130 is disposed at the periphery of the sensing region 120, and is utilized to prevent power lines of the capacitive sensing units 122 from forming an electrical connection with the conductive plate 110 through an unexpected external object during the touch detection process of the capacitive sensing units 122. In the embodiment, the conductive ring 130 surrounds the non-circuit neighboring sides 126, and are utilized to prevent power lines EL of the capacitive sensing units 122 near the non-circuit board neighboring sides 122 from forming an electrical connection with the conductive plate 110 sequentially through a glass protection 127 and an unexpected external object 128 (e.g., water drops, other liquids or other conductive objects that are not used for normal touch events). When a touch scanning signal is provided to at least one on-duty capacitive sensing unit of the capacitive sensing units 122, the conductive ring 130 synchronously receives a control signal identical to or associated with the touch scanning signal, such that the potential change of the conductive ring 130 is synchronous with the potential change of the at least one on-duty sensing unit. More specifically, the potential change of the conductive ring 130 is synchronous with the potential change of the capacitive sensing unit 122 (i.e., the on-duty sensing unit) that is currently receiving the foregoing touch scanning signal. For example, the conductive ring 130 synchronously receives the touch scanning signal or synchronously receives a control signal having a same potential or an equally proportional potential. Thus, the conductive ring 130 and the on-duty sensing unit are allowed to have synchronized potential changes or the same potential, so as to eliminate an unexpected potential difference when the two form an electrical connection through the power lines EL to further prevent false detecting results and possible subsequent erroneous operations.

As previously stated, in the embodiment, the conductive plate 110 may be made of a metal material, e.g., iron, and the method for manufacturing the conductive plate 110 may adopt known technologies. Further, the sensing region 120 includes a conductive material (e.g., indium tin oxide (ITO)) and an insulating material, and may similarly be made by known technologies. Further, the material of the conductive ring 130 may be the same as that of the electrode plate of the sensing region 120 to simplify associated manufacturing steps. However, one person implementing the present invention may select different materials and manufacturing steps to manufacture the conductive materials of the conductive ring 130 and the electrode plate of the sensing region 120. Further, depending on applications, the touch control device 100 may further include other known structural layers (e.g., a glass layer and an adhesive layer) and elements (e.g., independent touch sensing keys and associated circuits). Such details are generally known to one person skilled in the art and are unrelated to technical features of the present invention, and shall be omitted herein.

Again referring to FIG. 1a and FIG. 1b, to effectively isolate the capacitive sensing units 122 near the plurality of non-circuit board neighboring sides 126 from the conductive plate 110, in the embodiment, the width of the conductive ring 130 is given an appropriate restriction. For example, on the same section plane, a distance between a border of the conductive plate 110 and the conductive ring 130 surrounding the plurality of non-circuit board neighboring sides 126 is a first width W1, and the width of the conductive ring 130 surrounding the plurality of non-circuit board neighboring sides 126 is a second width W2, with the first width W1 being smaller than the second width W2. Further, in the embodiment and the embodiments below, the conductive ring 130 is a conductive body in a formed integral. However, depending on actual needs, a plurality of separate conductive bodies may be utilized to form the conductive ring 130.

Figure 2:
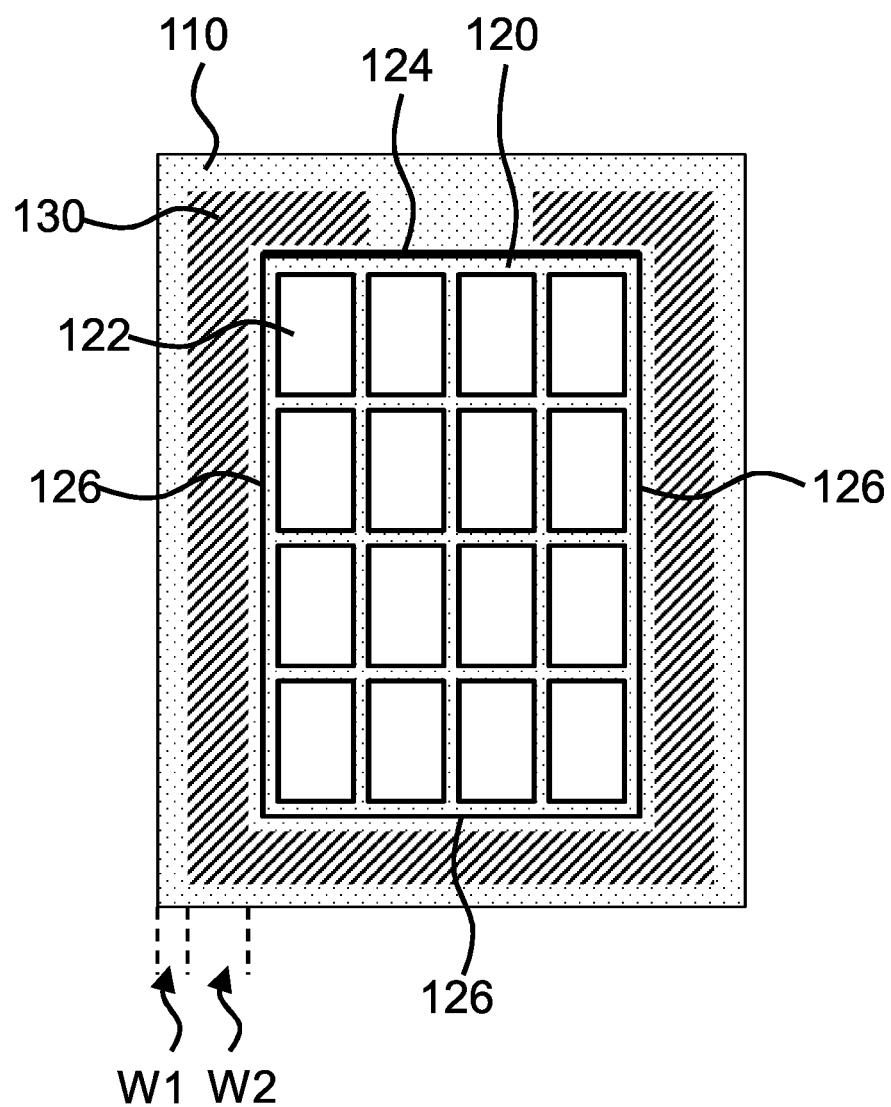
FIG. 2 is a top view of a touch control device according to another embodiment of the present invention.
Figure 3A:
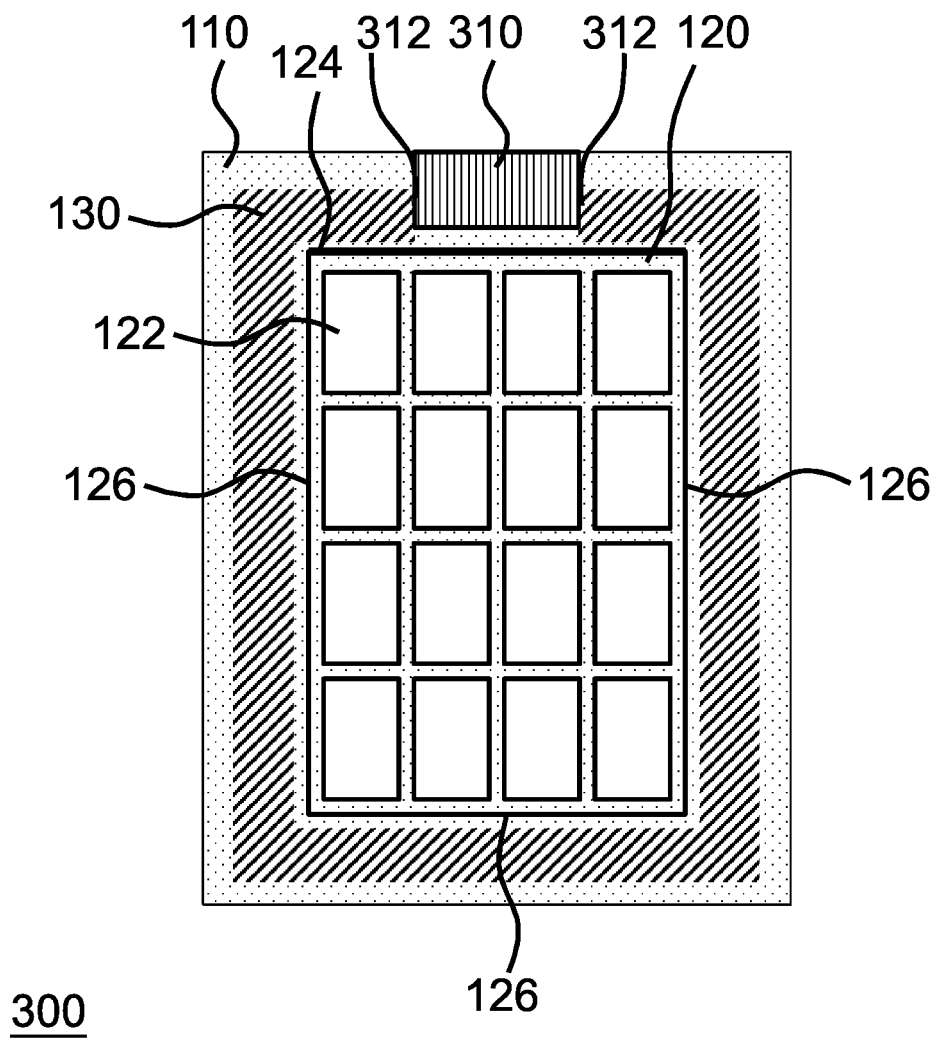
FIG. 3a is a schematic diagram of a touch control device combined with a circuit board according to an embodiment of the present invention.

FIG. 2 shows a schematic diagram of a touch control device according to another embodiment of the present invention. One difference of a touch control device 200 of the embodiment from the touch control device 100 in FIG. 1a is that, in addition to surrounding the non-circuit neighboring sides 126, the conductive ring 130 further surrounds at least a part of the circuit board neighboring side 124 to reinforce the isolation effect against power lines. FIG. 3a shows a schematic diagram of the touch panel in FIG. 2 combined with a circuit board according to an embodiment. As shown in FIG. 3a, in addition to the elements in FIG. 2, a touch control device 300 of the embodiment further includes a circuit board 310 (e.g., a flexible printed circuit, FPC). The circuit board 310 is disposed next to the circuit board neighboring side 124, and controls the potential change of the conductive ring 130 and the potential change of the on-duty sensing unit of the plurality of groups of capacitive sensing units 122. More specifically, the circuit board 310 provides the touch scanning signal or an equivalent signal to the conductive ring 130, and sequentially provides the touch scanning signal to the plurality of groups of capacitive sensing units 122. The circuit board 310 carries one or multiple touch integrated circuits or elements and lines required for operations, and is electrically connected to the plurality of groups of capacitive sensing units 122 and the conductive ring 130 through the layout of the lines. One person can implement the circuit board 310, the manufacture of the elements carried thereon, and the connections among the elements based on known technologies. Without affecting the disclosure and implementation of the present invention, such details are omitted herein.

Figure 3B:
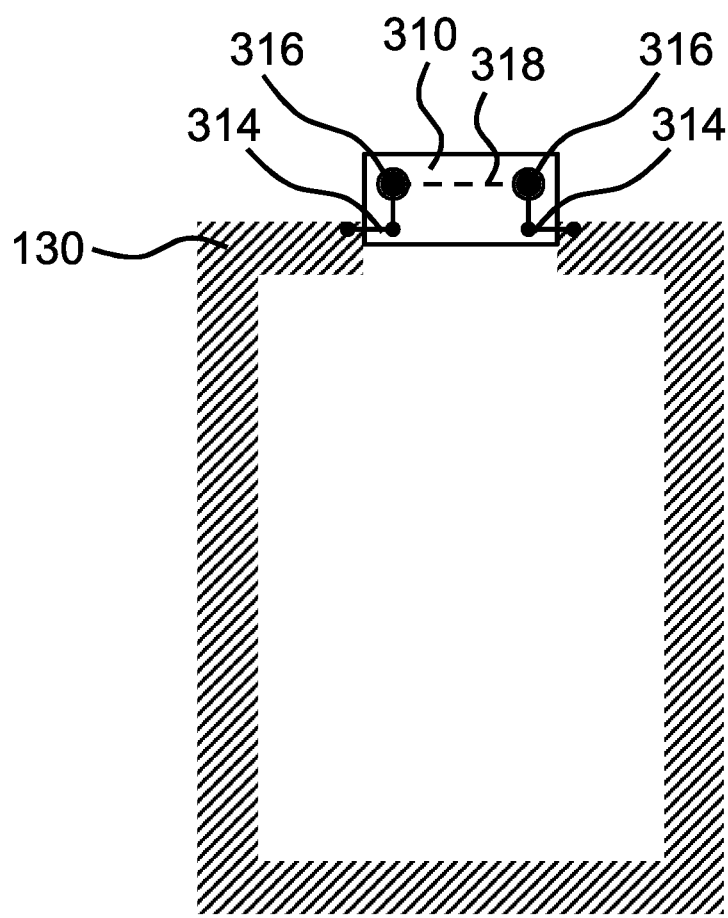
FIG. 3b is a schematic diagram of a conductive ring forming a conductive loop via a circuit board according to an embodiment of the present invention.

Again referring to FIG. 3a, a periphery of the circuit board 310 includes two circuit board sides 312, which are perpendicular to the circuit board neighboring side 124 of the sensing region 120. Further, the conductive ring 130 further surrounds at least a part of each of the circuit board sides 312 to prevent the power lines of the sensing region 120 from spilling over to the conductive plate 110. An included angle between the circuit board side 312 and the circuit board neighboring side 124 may also be an angle other than a right angle, e.g., the included angle between the two is between a first angel (e.g., 50°) and a second angel (e.g., 140°) to further increase flexibilities of the present invention. Further, as shown in FIG. 3b, the conductive ring 130 of the embodiment may form a conductive loop via the circuit board 310. More specifically, the conductive ring 130 forms the conductive loop via the circuit layout of the circuit board 310. For example, the conductive ring 130 forms the conductive loop via a line 314 of a first plane, a plurality of conductive through holes 316 and a line 318 of a second plane (e.g., shown by the dotted line in FIG. 3b). The first plane and the second plane are different planes. Alternatively, the conductive ring 130 may also form the conductive loop via paths of the same plane of the circuit board 310. It should be noted that, in the embodiment, the circuit layout of the circuit board 310 further includes one or a plurality of integrated circuits (e.g., a touch integrated circuit) (not shown), whose configuration position and functions may be determined by one implementing the present invention.

Figure 4:
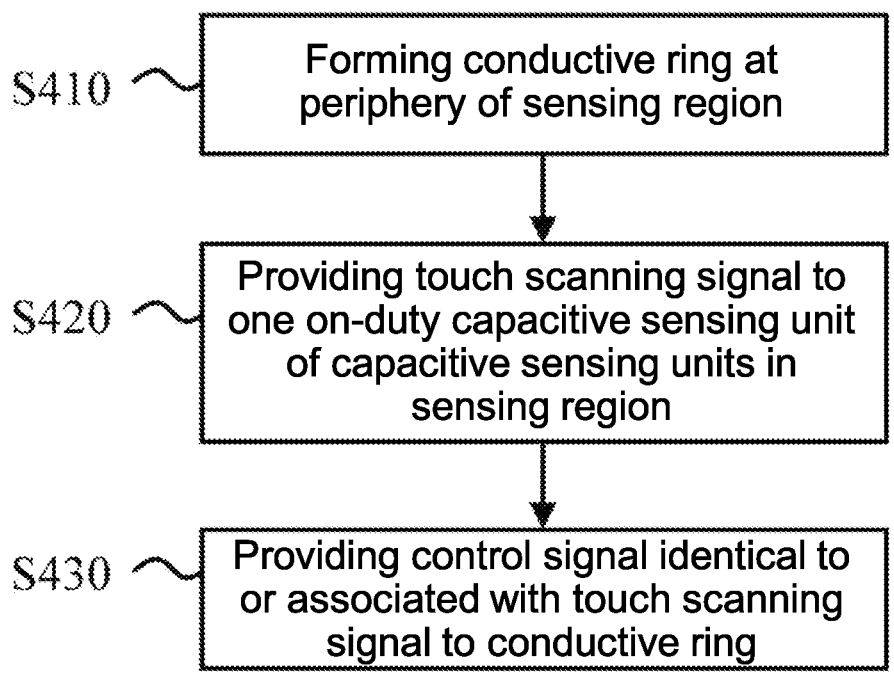
FIG. 4 is a flowchart of a touch control method according to an embodiment of the present invention.

In addition to the above device, the present invention further discloses a touch control method to prevent a conductive plate (e.g., the conductive plate 110 in FIG. 1) and a sensing region (e.g., the sensing region 120 in FIG. 1) from forming an electrical connection through an unexpected external object (e.g., water drops, liquids or other conductive objects of non-normal touch events). The method may be performed by the device of the present invention or an equivalent device. The sensing region includes a plurality of capacitive sensing units, and a periphery of the sensing region is formed by a circuit board neighboring side and a plurality of non-circuit board neighboring sides. Referring to FIG. 4, the touch control method according to an embodiment includes following steps.

In step S410, a conductive ring is formed at the periphery of the sensing region.

In step S420, a touch scanning signal is provided to one on-duty capacitive sensing unit of the capacitive sensing units.

In step S430, a control signal identical to or associated with the touch scanning signal is provided to the conductive ring.

One person having ordinary skill in the art can understand implementation details and variations of the method of the present invention based on the description associated with the foregoing device of the present invention. More specifically, the technical features of the foregoing device of the present invention may be reasonably applied to the method of the present invention. Therefore, without affecting the disclosure and implementation of the present invention, such details are omitted herein.

Figure 5:
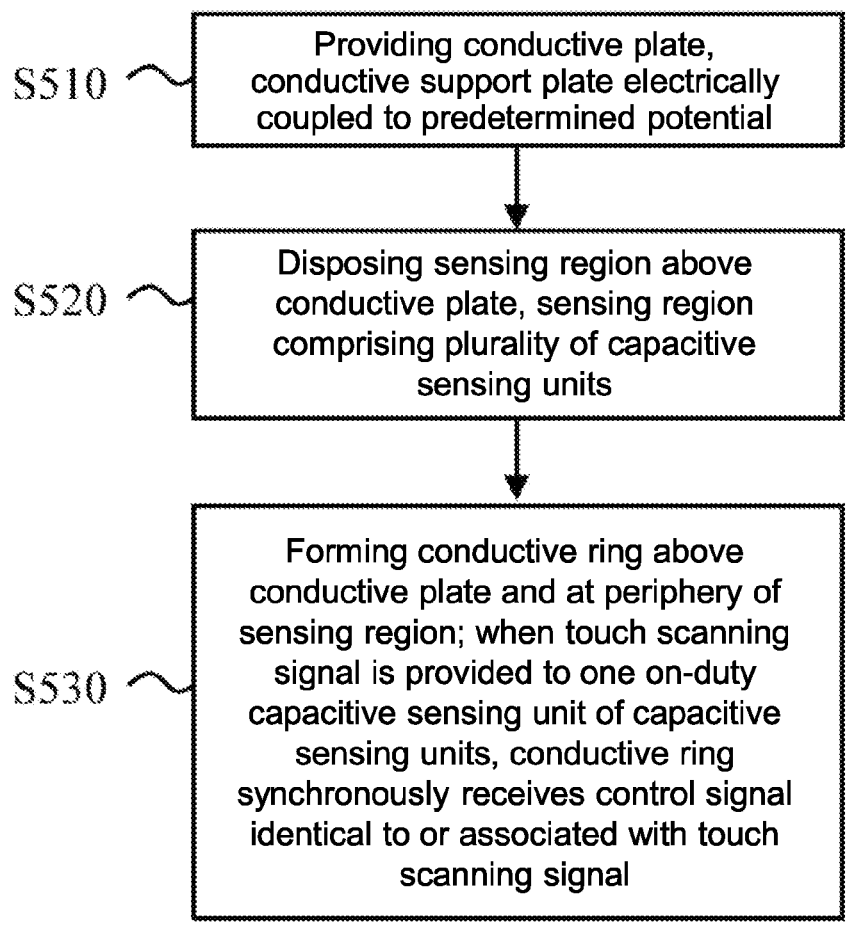
FIG. 5 is a flowchart of a method for forming a touch control device according to an embodiment of the present invention.

In addition to the above touch control method, the present invention further discloses a method for forming a touch control device to form the touch control device of the present invention or an equivalent device. As shown in FIG. 5, the method for forming a touch control device includes following steps.

In step S510, a conductive plate is provided. The conductive plate is electrically coupled to a predetermined potential.

In step S520, a sensing region is disposed above the conductive plate. The sensing region includes a plurality of capacitive sensing units.

In step S530, a conductive ring is formed above the conductive plate and at a periphery of the sensing region. When a touch scanning signal is provided to one on-duty capacitive sensing unit of the capacitive sensing units, the conductive ring synchronously receives a control signal identical to or associated with the touch scanning signal.

Similarly, the technical features of the abovementioned touch control device and touch control method may be reasonably applied to the method for forming a touch control device of the present invention. Without affecting the disclosure and implementation of the present invention, such details are omitted herein. It should be noted that, the term "neighboring" means that a distance between two objects is smaller than a predetermined value (e.g., 1 cm). Further, in the disclosure, the term "above" or similar space descriptive terms are relative instead of absolute. Further, shapes, sizes, ratios and sequences of the steps in the drawings are illustrative for one person skilled in the art to better understand the present invention, and are not to be construed as limitations to the present invention.

In conclusion, in the touch control device and method and the method for forming a touch control device of the present invention, by disposing the conductive ring and controlling the potential change of the conductive ring, improper electrical connections between the conductive plate and the sensing region are eliminated to further prevent false positives and subsequent erroneous operations. Further, the conductive ring and the potential control of the conductive ring can be easily implemented, so as to provide a cost-effective advantage in addition to being capable of preventing false positives.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A touch control device, comprising:
   a conductive plate, electrically coupled to a predetermined potential;
   a sensing region, located above the conductive plate, comprising a plurality of capacitive sensing units;

a conductive ring, located above the conductive plate, disposed at a periphery of the sensing region;

wherein, when a touch scanning signal is provided to one on-duty capacitive sensing unit of the capacitive sensing units, the conductive ring synchronously receives a control signal associated with the touch scanning signal, and a circuit board, located above the conductive plate, disposed at a circuit board neighboring side of the sensing region, configured to provide the touch scanning signal and the control signal, wherein a width of the circuit board is smaller than a length of the circuit board neighboring side, wherein the conductive ring forms a conductive loop via the circuit board, and wherein the conductive ring forms the conductive loop via a plurality of conductive contact points of a first plane of the circuit board, a plurality of conductive through holes of the circuit board and a plurality of conductive contact points of a second plane of the circuit board, and the first plane and the second plane are different planes.

2. The touch control device according to claim 1, wherein a material of the conductive plate is metal, and the predetermined potential is a ground potential.

3. The touch control device according to claim 1, wherein the conductive ring prevents power lines of the on-duty capacitive sensing unit from forming an electrical connection with the conductive plate through an unexpected external object.

4. The touch control device according to claim 1, wherein the on-duty capacitive sensing unit comprises a triangular electrode plate.

5. The touch control device according to claim 1, wherein a distance between a border of the conductive plate and a border of the conductive ring is a first width, a width of the conductive ring is a second width, and the first width is smaller than the second width.

6. The touch control device according to claim 1, wherein the conductive ring surrounds at least a part of the circuit neighboring side and at least a part of the circuit board.

7. The touch control device according to claim 1, wherein a periphery of the circuit board comprises two circuit board sides, the two circuit board sides are perpendicular to the circuit board neighboring side or an included angle between the two is between a first angle and a second angle.

8. The touch control device according to claim 1, wherein the on-duty capacitive sensing unit is located at an edge of the sensing region.

* * * * *